(12) United States Patent
Dunkle et al.

(10) Patent No.: US 12,545,338 B2
(45) Date of Patent: Feb. 10, 2026

(54) TRACTOR FIFTH WHEEL SAFETY SYSTEM AND METHOD OF USING THE SAME

(71) Applicants: Kyle Dunkle, Fredericksburg, VA (US); Daniel Dunkle, Fredericksburg, VA (US)

(72) Inventors: Kyle Dunkle, Fredericksburg, VA (US); Daniel Dunkle, Fredericksburg, VA (US)

(*) Notice: Subject to any disclaimer, the term of this patent is extended or adjusted under 35 U.S.C. 154(b) by 447 days.

(21) Appl. No.: 18/128,474

(22) Filed: Mar. 30, 2023

(65) Prior Publication Data

US 2023/0347997 A1   Nov. 2, 2023

Related U.S. Application Data

(60) Provisional application No. 63/336,329, filed on Apr. 29, 2022.

(51) Int. Cl.
| | |
|---|---|
| *B62D 53/12* | (2006.01) |
| *B60D 1/01* | (2006.01) |
| *B60D 1/28* | (2006.01) |

(52) U.S. Cl.
CPC ............ *B62D 53/12* (2013.01); *B60D 1/015* (2013.01); *B60D 1/28* (2013.01)

(58) Field of Classification Search
CPC ........... B62D 53/10; B60D 1/28; B60D 1/015
See application file for complete search history.

(56) References Cited

U.S. PATENT DOCUMENTS

| | | | | |
|---|---|---|---|---|
| 5,421,600 | A * | 6/1995 | Jones | B60D 1/36 |
| | | | | 280/428 |
| 9,975,588 | B2 * | 5/2018 | Mohamad Jembari | ...... |
| | | | | B60K 35/60 |
| 10,471,785 | B1 * | 11/2019 | Murad | B60D 1/28 |
| 11,203,333 | B2 * | 12/2021 | Kennedy | B60T 13/263 |
| 11,358,659 | B2 * | 6/2022 | Pearson | B60D 1/015 |
| 2015/0102583 | A1 * | 4/2015 | Reimer | B60D 1/015 |
| | | | | 280/433 |

FOREIGN PATENT DOCUMENTS

| | | | | |
|---|---|---|---|---|
| EP | 1595774 A2 * | 11/2005 | ......... | B62D 53/0842 |
| WO | WO-2020051619 A1 * | 3/2020 | ............ | B62D 53/12 |

* cited by examiner

*Primary Examiner* — Valentin Neacsu
*Assistant Examiner* — Hosam Shabara
(74) *Attorney, Agent, or Firm* — Law Office of Jerry Joseph, PLC; Jerry Joseph

(57) ABSTRACT

A safety system for a towing vehicle and a towed object including a towing vehicle coupling, a towed vehicle connection point that is engageable with the towing vehicle coupling, a coupling lock that is movable between a locked and unlocked positions, a lock sensor that is operative to detect whether the coupling lock is in the locked or unlocked position, a brake system that is moveable between a brake system engaged position and a brake system disengaged position, a controller, wherein the controller is in operative connection with the lock sensor and the brake system, and wherein the controller is operative to receive signals from the lock sensor, wherein in response to a signal from the lock sensor indicating the coupling lock is in the locked position, the controller is operative to enable the brake system to be in the disengaged position through manipulation of manual parking brake valve.

15 Claims, 5 Drawing Sheets and a towed object including a towing vehicle coupling, a towed object connection point, wherein the towed object connection point is engageable with the towing vehicle coupling, a coupling lock, wherein the coupling lock is movable between a locked position and an unlocked position, a lock sensor, wherein the lock sensor is operative to detect whether the coupling lock is in the locked position or in the unlocked position, a brake system, wherein the brake system is moveable between a brake system engaged position and a brake system disengaged position, a controller, wherein the controller is in operative connection with the lock sensor and the brake system, and wherein the controller is operative to receive signals from the lock sensor, wherein in response to a signal from the lock sensor indicating the coupling lock is in the locked position, the controller is operative to cause the brake system to be in the disengaged position.

TRACTOR FIFTH WHEEL SAFETY SYSTEM AND METHOD OF USING THE SAME

CROSS-REFERENCE

This application claims priority to provisional application No. 63/336,329, filed on Apr. 29, 2022, and all the benefits accruing therefrom under 35 U.S.C § 119, the contents of which in its entirety are herein incorporated by reference.

BACKGROUND OF THE INVENTION

1. Field of the Invention

The present general inventive concept relates to safety systems and methods that have been developed to indicate whether a tractor fifth wheel is properly locked around a kingpin of a trailer. In particular, the present general inventive concept relates to a system and a method that prevents a tractor, semi-truck, or towing vehicle from moving relative to a trailer or towed object until a fifth wheel or coupling in operative connection with the towing vehicle is properly connected to a kingpin or other connection point of the trailer or towed object.

2. Description of Related Art

There have been previous systems that have been developed to indicate whether a tractor fifth wheel is properly locked around a kingpin of a trailer, for example, a fifth wheel lock indicator light. However, these prior art devices do not provide a system for preventing movement of a tractor relative to a trailer when there is an improper connection between the fifth wheel of the tractor and the kingpin of the trailer.

Therefore, what is desired is a system and method that prevents damage to a tractor and trailer, as well as the trailer's contents, by preventing a trailer from being dropped due to an improper fifth wheel connection.

BRIEF SUMMARY OF THE INVENTION

The present general inventive concept provides a safety system for a towing vehicle and a towed object including a towing vehicle coupling, a towed object connection point, wherein the towed object connection point is engageable with the towing vehicle coupling, a coupling lock, wherein the coupling lock is movable between a locked position and an unlocked position, a lock sensor, wherein the lock sensor is operative to detect whether the coupling lock is in the locked position or in the unlocked position, a brake system, wherein the brake system is moveable between a brake system engaged position and a brake system disengaged position, a controller, wherein the controller is in operative connection with the lock sensor and the brake system, and wherein the controller is operative to receive signals from the lock sensor, wherein in response to a signal from the lock sensor indicating the coupling lock is in the locked position, the controller is operative to cause the brake system to be in the disengaged position.

In response to a signal from the lock sensor indicating the coupling lock is in the unlocked position, the controller may be operative to cause the brake system to be in the engaged position.

The brake system may include an air compressor, an air supply line, and brake line valve, wherein the compressor, air supply line, and the brake line valve are in fluid connection, and wherein the brake line valve may be moveable between an open position and a closed position.

The controller may be configured to be in operative connection with the brake line valve, and wherein the controller is operative to cause the brake line valve to move between the open position and the closed position, wherein in the closed position of the brake line valve the brake system is in the engaged position, and wherein in the open position of the brake line valve the brake system is in the disengaged position.

The safety system may further include a manually engageable reverse indicator switch in operative connection with the controller, wherein the manually engageable reverse indicator switch is moveable between a reverse indicator switch on position and a reverse indicator switch off position, wherein in the reverse indicator switch on position, the controller may be prevented from causing the brake system to be in the engaged position.

The safety system may further include at least one output device in operative connection with the reverse indicator switch, wherein when the reverse indicator switch is in the on position, the output device is operative to output at least one of an audible or visual output.

The safety system may further include a manually engageable pull away override switch in operative connection with the controller, wherein the manually engageable pull away override switch is moveable between a pull away override switch on position and pull away override switch off position, wherein in the pull away override switch on position, the controller is prevented from causing the brake system to be in the engaged position.

The safety system may further include at least one output device in operative connection with the pull away override switch, wherein when the pull away override switch is in the on position, the output device is operative to output at least one of an audible or visual output.

The safety system may further include a load bearing suspension system in operative connection with the towing vehicle and configured to support the load of the towed object, and a load bearing suspension sensor in operative connection with the load bearing suspension system and operative to sense whether the towing vehicle is supporting the load of the towed object, wherein the controller is in operative connection with the load bearing suspension sensor and is operative to receive signals therefrom, wherein responsive to a signal from the load bearing suspension sensor indicating the towing vehicle is supporting the load of the towed object, the controller is operative to cause the brake system to be in the engaged position until the controller receives a signal indicating the coupling lock is in the locked position.

The load bearing suspension may include at least one airbag, wherein the at least one airbag is in operative connection with a rear axle of the towing vehicle, and wherein the at least one airbag is in operative fluid connection with the air compressor.

The load bearing sensor may be in operative connection with the at least one airbag and is operative to determine a current air pressure within the airbag, wherein the controller is operative to receive a signal from the load bearing sensor indicating the current air pressure of the airbag and responsive thereto, the controller is operative to determine whether the towing vehicle is supporting the load of the towed object.

The present general inventive concept also provides a computer implemented method of a safety system for a towing vehicle and a towed object including determining with a lock sensor whether a towing vehicle coupling is locked in engagement with a towed vehicle connection point, receiving with a controller a signal from the lock sensor indicating an unlocked position, wherein in the unlocked position the towed object connection point is not locked in engagement with the towing vehicle coupling, responsive to the received signal indicating the unlocked position, causing with the controller a brake system to be in an engaged position.

The computer implemented method may further include receiving with a controller a signal from the lock sensor indicating a locked position, wherein in the locked position the towed object connection point is locked in engagement with the towing vehicle coupling; and responsive to the received signal indicating the locked position, causing with the controller the brake system to be in a disengaged position.

The computer implemented method may further include responsive to a reverse indicator switch in a reverse indicator switch on position, causing with the controller the brake system to be in the disengaged position.

The computer implemented method may further include responsive to a pull away override switch in a pull away override switch on position, causing with the controller the brake system to be in the disengaged position.

The computer implemented method may further include responsive to a signal from a load bearing sensor indicating the towing vehicle is supporting a load of the towed object, causing with the controller the brake system to be in the engaged position.

The computer implemented method may further include responsive to a signal from a load bearing sensor indicating the towing vehicle is supporting a load of the towed object, causing with the controller the brake system to be in the engaged position until the controller receives a signal from the lock sensor indicating the coupling lock is in the locked position.

The computer implemented method may further include responsive to at least one of the reverse indicator switch on position or the pull away override switch on position, causing with the controller an output device to output at least one of an audible output or a visual output.

The present general inventive concept also provides an electronic device including at least one processor and a non-transitory computer-readable storage medium coupled to the at least one processor and configured to store instructions for execution by the at least one processor, wherein the programming instructions instruct the at least one processor to perform operations for preventing movement of a towing vehicle for safety, the operations including obtaining a locked signal from a sensor indicating a trailer is properly secured to the towing vehicle; and transmitting a release signal to a brake system to allow the towing vehicle to move from a first position to a second position.

The operations may further include obtaining an unlocked signal from the sensor indicating the trailer is not properly secured to the towing; and transmitting a further signal to the brake system to prevent the towing vehicle from moving from the first position to the second position.

Additional features and embodiments of the present general inventive concept will be apparent from the following detailed description, drawings, and claims.

BRIEF DESCRIPTIONS OF THE DRAWINGS

These and/or other aspects of the present general inventive concept will become apparent and more readily appreciated from the following description of the exemplary embodiments, taken in conjunction with the accompanying drawings of which:

DETAILED DESCRIPTION OF THE INVENTION

Figure 1:
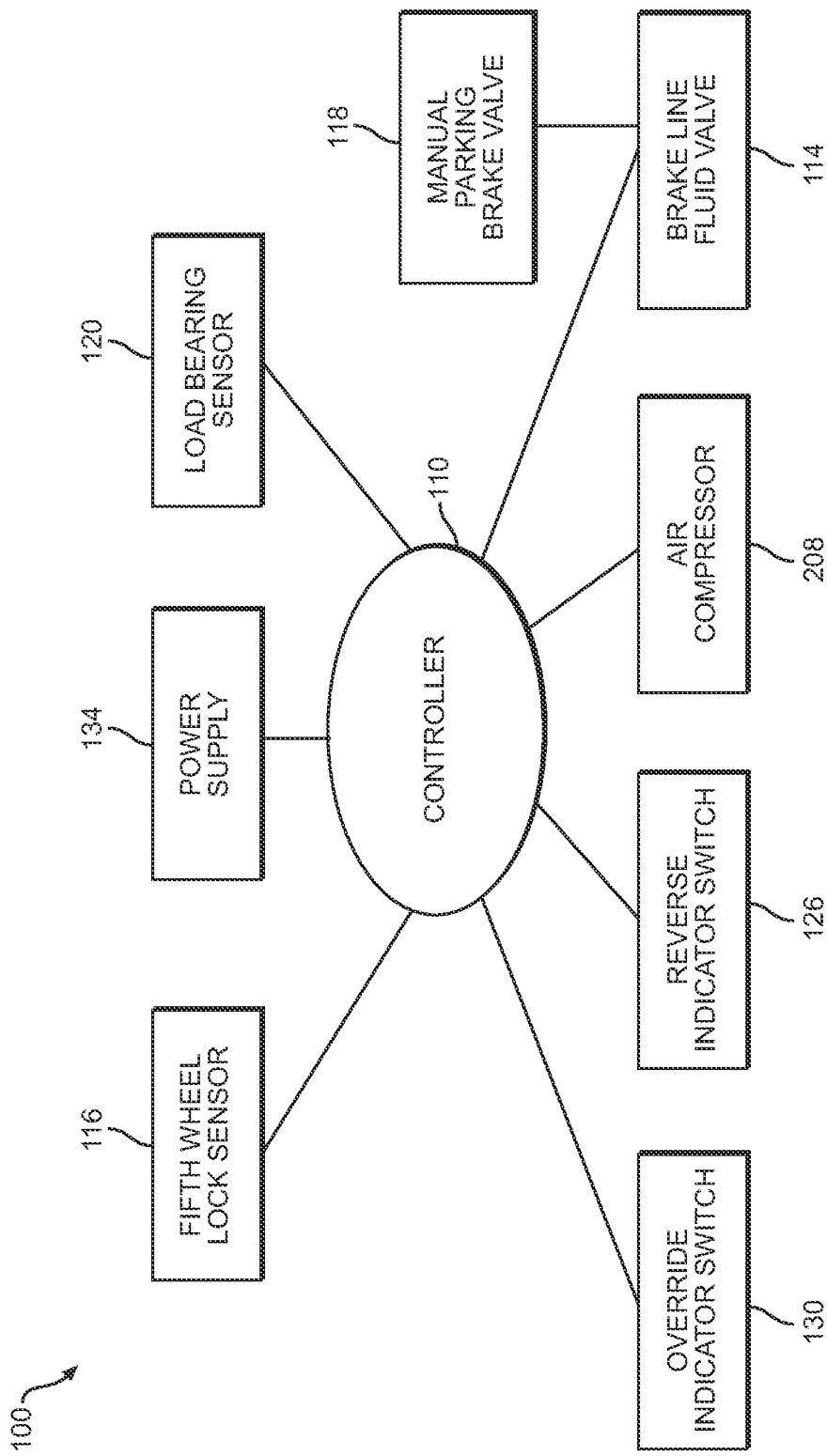
FIG. 1 is a configuration diagram of a safety system according to an exemplary embodiment of the present general inventive concept.

Reference will now be made in detail to the exemplary embodiments of the present general inventive concept, examples of which are illustrated in the accompanying drawings, wherein like reference numerals refer to the like elements throughout. The exemplary embodiments are described below in order to explain the present general inventive concept by referring to the figures.

Figure 2:
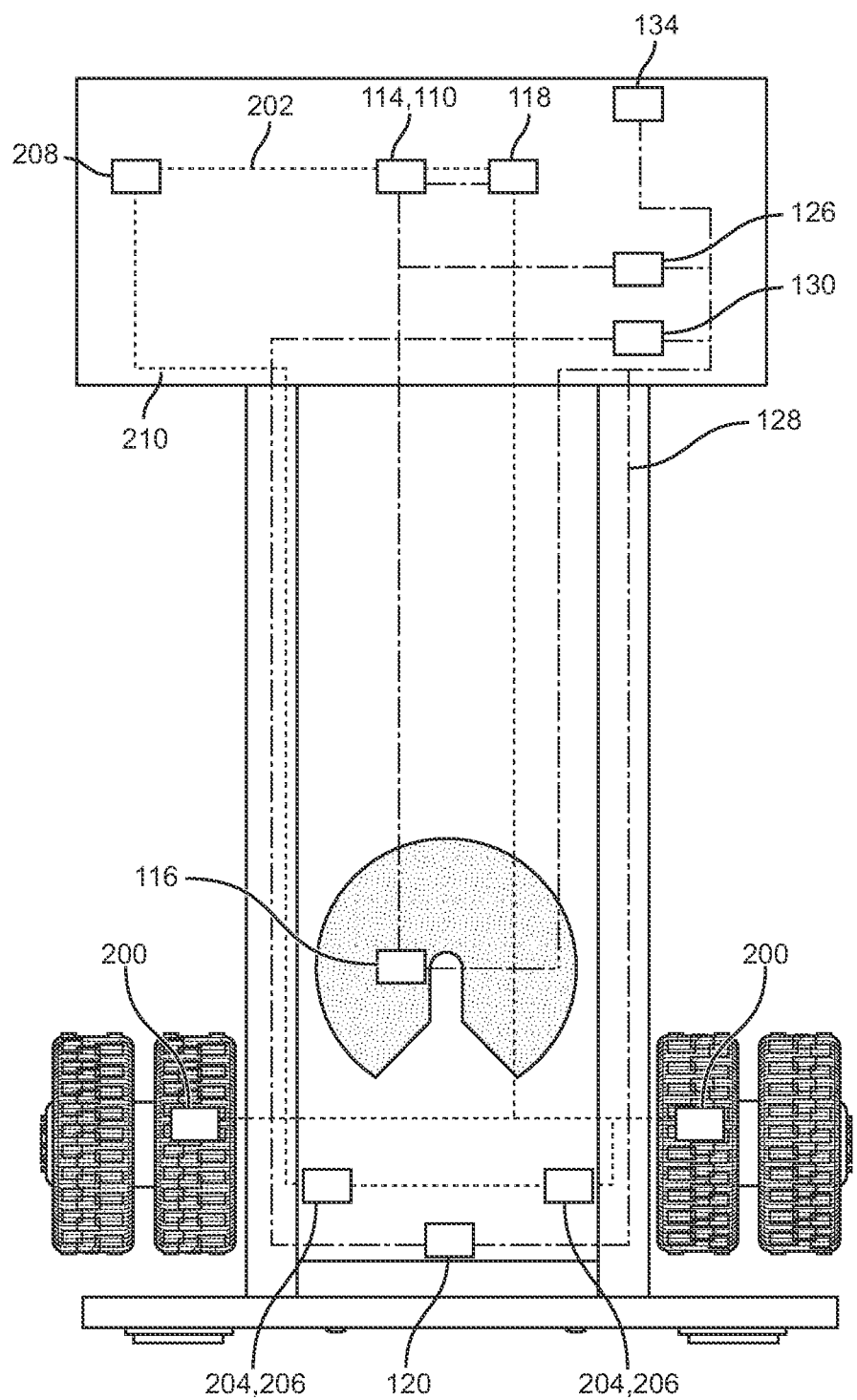
FIG. 2 is a schematic diagram of the safety system illustrated in FIG. 1.
Figure 3:
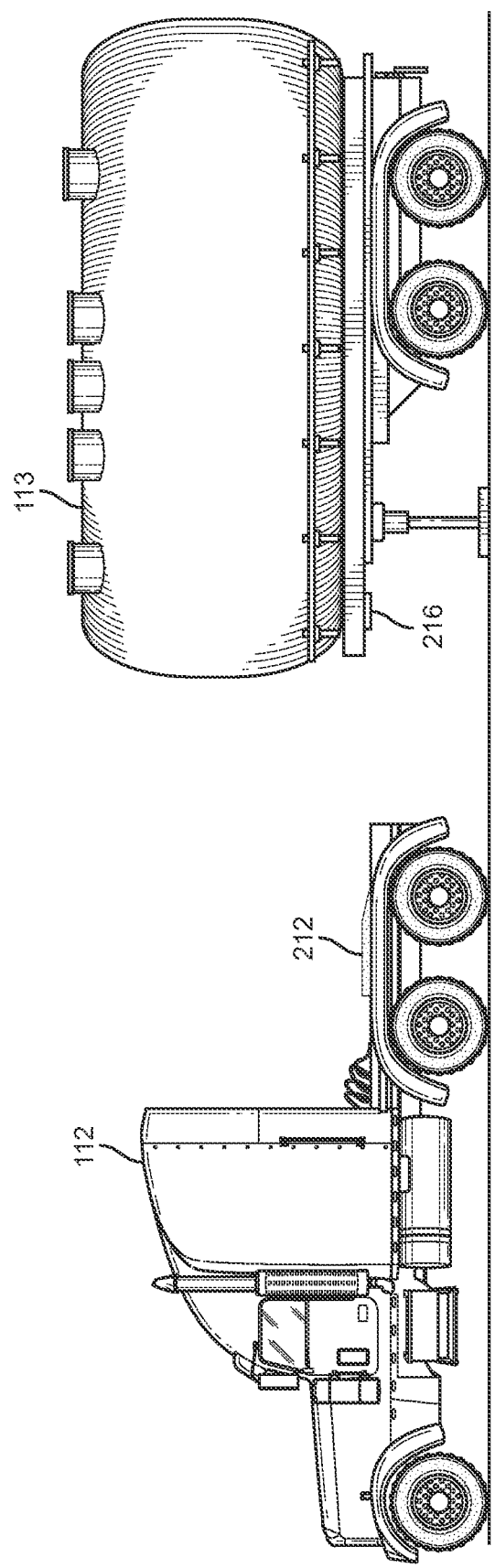
FIG. 3 is a side view of a towing vehicle and towed object and the safety system illustrated in FIG. 1.
Figure 4:
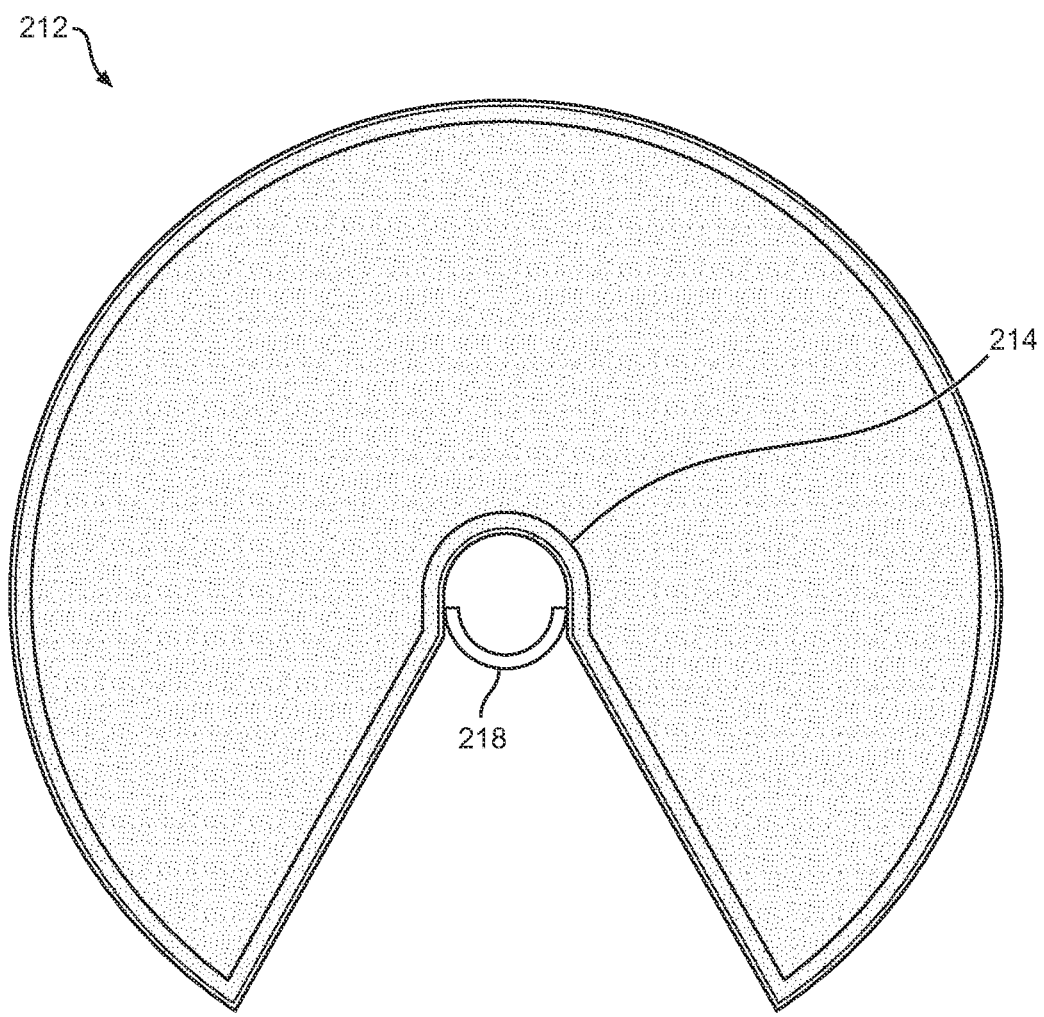
FIG. 4 is a plan view of a fifth wheel of the towing vehicle illustrated in FIG. 3.
Figure 5:
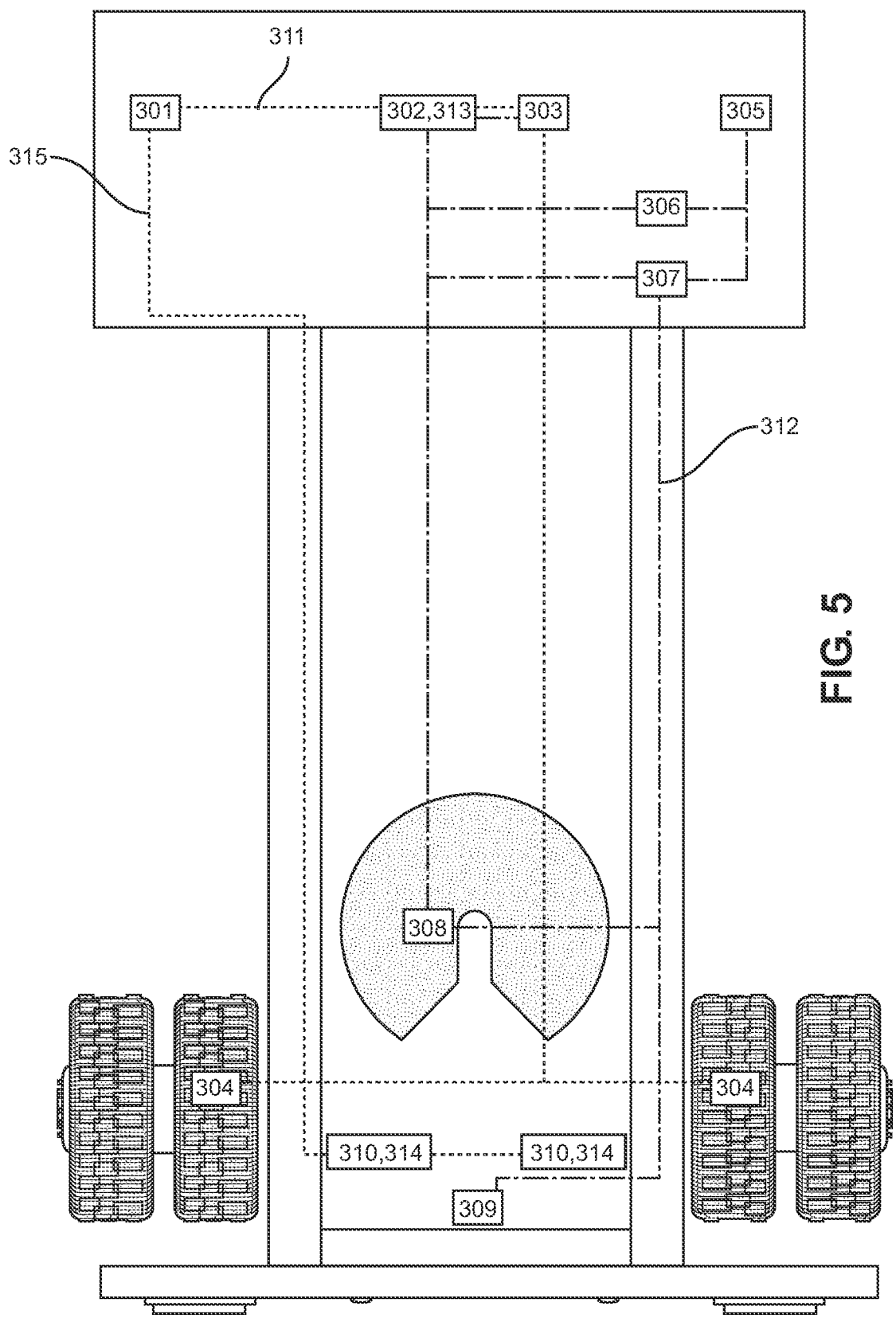
FIG. 5 is a schematic diagram of a safety system according to another alternative exemplary embodiment of the present general inventive concept.

The present general inventive concept relates to a system and method that prevents damage to a towing vehicle and a towed object by preventing the towing vehicle from moving relative to the towed object until a proper towing connection is established between the towing vehicle and the towed object. FIG. 1 is a configuration diagram of a safety system according to an exemplary embodiment of the present general inventive concept, FIG. 2 is a schematic diagram of the safety system illustrated in FIG. 1, and FIG. 3 is a side view of a towing vehicle and towed object and the safety system illustrated in FIG. 1. FIG. 4 is a plan view of a fifth wheel of the towing vehicle illustrated in FIG. 3 and FIG. 5 is a schematic diagram of a safety system according to another alternative exemplary embodiment of the present general inventive concept.

Referring now to FIGS. 1, an exemplary embodiment provides a safety system for a tractor or towing vehicle 112 or towing vehicle 112 fifth wheel and trailer or towed object 113, designated generally as 100, is illustrated. In the present embodiment, the exemplary system 100 is designed and configured as a safety system for preventing damage to a tractor or towing vehicle 112 and trailer or towed object 113, as well as the trailer or towed object 113's contents, by facilitating avoidance of a dropped trailer or towed object 113 as a result of an improper fifth wheel connection. In alternative exemplary embodiments, the exemplary system 100 is designed and configured as a safety system for preventing damage to a towing vehicle and a towed object by preventing the towing vehicle from moving relative to the towed object until a proper connection between them is achieved.

That is, the exemplary safety system 100 is designed as a system for preventing a tractor or towing vehicle 112 from dropping a trailer or towed object 113 due to an improper connection between a tractor or towing vehicle 112 and a trailer or towed object 113 by preventing the tractor or towing vehicle 112 from moving relative to the trailer or towed object 113 until a proper connection between the tractor or towing vehicle 112 and trailer or towed object 113 is achieved. In exemplary embodiments, the exemplary safety system 100 is designed to prevent a dropped trailer or towed object 113 resulting from an improper connection between a fifth wheel of a tractor or towing vehicle 112 and a kingpin of the trailer or towed object 113 by preventing the tractor or towing vehicle 112 from moving relative to the trailer or towed object 113 until a proper connection is achieved. In alternative exemplary embodiments, the exemplary system is designed to prevent a towing vehicle from moving forward relative to a towed object until a connection point of the towing vehicle is in locked engagement with a connection point of the towed object. However, the present general inventive concept is not limited thereto.

In exemplary embodiments, the exemplary system 100 is operative to prevent the tractor or towing vehicle 112 from moving relative to the trailer or towed object 113 when there is an improper connection between the fifth wheel of the tractor or towing vehicle 112 and the kingpin of the trailer or towed object 113. In particular, the exemplary embodiment is operative to maintain an applied or engaged position of the parking brakes or other brake system, thereby preventing the tractor or towing vehicle 112 from moving relative to the trailer or towed object 113 until the fifth wheel in operative connection with the tractor or towing vehicle 112 is properly connected to the kingpin of the trailer or towed object 113. Of course, this embodiment is merely exemplary, and in other embodiments, other arrangements may be used.

As shown in FIGS. 1 and 2, in exemplary embodiments, the exemplary safety system 100 includes a controller 110, a parking brake fluid supply line valve 114, also referred to herein as a brake line valve, a fifth wheel lock condition sensor 116, also referred to herein as a lock sensor or lock position sensor, a load bearing sensor 120, a reverse indicator switch 126, and a pull away override switch 130. In exemplary embodiments, the controller 110, brake line valve 114, fifth wheel lock condition sensor 116, the load bearing sensor 120, the reverse indicator switch 126, and pull away override switch 130 are all in operative wired connection with at least one circuit 128. However, the present general inventive concept is not limited thereto.

In alternative exemplary embodiments, the controller 110, brake line valve 114, fifth wheel lock condition sensor 116, the load bearing sensor 120, the reverse indicator switch 126, and pull away override switch 130 may all be in operative wireless connection.

In exemplary embodiments, the controller 110 includes a processor and a memory including a processor readable medium. The exemplary memory is operative to store processor readable instructions for carrying out the operations, functions, and component communications of the exemplary embodiments. The exemplary processor is operative to carry out the operations, functions, and component communications of the exemplary embodiments through execution of the processor readable instructions. As can be appreciated, this embodiment is merely exemplary, and in other embodiments, other embodiments may be used.

As shown in FIG. 2, in exemplary embodiments, the system 100 is in operative connection with a battery or power supply or source 134 of the tractor or towing vehicle 112 or a separate battery embodiment operatively mounted on the tractor or towing vehicle 112. The system 100 is operative to receive power from the battery. Of course, this power supply embodiment is merely exemplary, and in other embodiments, other embodiments may be used.

In exemplary embodiments, the exemplary tractor or towing vehicle 112 includes parking brakes or brake system 200 and an air or fluid supply line 202 in operative connection with the parking brakes 200. The parking brakes 200 are moveable between an applied or engaged position and an unapplied or disengaged position. In the engaged position of the parking brakes 200, the tractor or towing vehicle 112 or towing vehicle is prevented from moving. For example, the exemplary brake system 200 prevents the wheels of the tractor or towing vehicle 112 from rotating. In the disengaged position of the parking brakes 200, the tractor or towing vehicle 112 or towing vehicle is enabled to move. In alternative exemplary embodiments, other brake systems may be used. Of course, this parking brake embodiment is merely exemplary, and in other embodiments, other embodiments may be used.

In exemplary embodiments, the presence or absence of an air supply in the fluid supply line 202 is operative to cause a change in the position of the brakes 200. For example, when no air is moving through the supply line 202, the parking brakes 200 are engaged or in the applied position as a result of a spring force causing the parking brakes 200 to be applied. When air is moving through supply line 202, the air supply is operative to overcome the force of the spring and to cause the brakes 200 to be disengaged, or in an unapplied position.

In exemplary embodiments, the exemplary air supply line 202 includes a brake line valve 114 in operative fluid connection therewith. The exemplary brake line valve 114 is moveable between an open position and a closed position. In the open position of the brake line valve 114, the brake system 200 is enabled to be moved to the disengaged position by manual manipulation of a parking brake valve 118. In the closed position of the brake line valve 114, the brake system 200 is in the engaged position. The exemplary brake line valve 114 is in operative connection with controller 110. The exemplary controller 110 is operative cause the brake line valve 114 to be moved between the open and closed positions. However, this system for changing the position of the parking brake is merely exemplary, and in other embodiments, other parking brake systems may be used.

The exemplary tractor or towing vehicle 112 further includes a load bearing suspension 204. The exemplary load bearing suspension 204 includes at least one airbag 206 and associated brackets in operative connection with the rear axle of the tractor or towing vehicle 112 or towing vehicle. The exemplary load bearing suspension 204 includes an air compressor 208 and an air supply line 210. The exemplary compressor 208 and the air supply line 210 are operative to provide a supply of air to inflate the airbags 206. The airbags 206 also include an air release valve through which air may be released from the airbags 206. The air release valve is manually moveable between open and closed positions in order to control the volume of air within the airbags 206. Of course, this embodiment is merely exemplary, and in other embodiments, other embodiments may be used.

The suspension 204 is operative to provide support for the load of the trailer or towed object 113, thereby providing better control of the tractor or towing vehicle 112 while towing the trailer or towed object 113. The load bearing suspension 204 is also operative to raise and lower the rear axle of the tractor or towing vehicle 112 to vertically align the tractor or towing vehicle 112 fifth wheel with a kingpin of a trailer or towed object 113.

However, the present general inventive concept is not limited thereto. That is, the exemplary system 100 is configured to operate in association with these other load bearing suspensions.

As best shown in FIGS. 3 and 4, the exemplary tractor or towing vehicle 112 further includes a fifth wheel 212 mounted on the tractor or towing vehicle 112 adjacent the rear axle of the tractor or towing vehicle 112. In alternative exemplary embodiments, the exemplary fifth wheel 212 may be referred to as a towing vehicle coupling 212. The exemplary fifth wheel 212 includes a throat 214 for accepting a kingpin 216 of a trailer or towed object 113. The kingpin 216 may be alternatively referred to herein as a towed vehicle connection point 216. The fifth wheel 212 further includes a lock 218 that is operative to secure the kingpin 216 in the throat 214, and which prevents the trailer or towed object 113 from separating from the tractor or towing vehicle 112 during towing. Lock 218 may be alternatively referred to herein as a coupling lock 218. However, the present general inventive concept is not limited thereto.

Referring again to FIG. 2, in exemplary embodiments, the exemplary controller 110 is operative to receive signals from the fifth wheel lock condition sensor 116 and the load bearing sensor 120. In response to the received signals, the exemplary controller 110 is operative to cause the brake line valve 114 in the brake fluid supply line 202 to move between open and closed positions. In alternative exemplary embodiments, other sensors may be used. For example, in alternative exemplary embodiments, a connection point lock sensor may be used. The exemplary connection point lock sensor comprises any sensor that can be used in association with other trailer or towed object 113 or towed object connection methods or couplings. However, the present general inventive concept is not limited thereto.

In exemplary embodiments, the exemplary fifth wheel lock sensor 116 is in operative connection with the lock 218 of the fifth wheel 212. The exemplary lock sensor 116 is operative to sense whether the lock 218 of the fifth wheel 212 is in a locked condition or position or in an unlocked condition or position. In the locked condition or position of the lock 218, the kingpin 216 is operatively fixed within the throat 214 of the fifth wheel 212 and is unable to be removed therefrom until manual or other release is performed by the operator. In the unlocked condition or position of the lock 218, the kingpin 216 is enabled to be removed from the throat 214 of the fifth wheel 212, for example, by the operator causing the truck to drive forward away from the trailer or towed object 113. Of course, this towing vehicle and towed object connection method is merely exemplary, and in other embodiments, other connection methods may be used including other locks in association therewith.

In exemplary embodiments, controller 110 is operative to receive signals via circuit 128 relaying the locked or unlocked condition or position of lock 218. Responsive to a signal indicating that the lock 218 is in the unlocked condition or position, the controller 110 is operative to cause the brake line valve 114 in the fluid supply line 202 of the parking brakes 200 to be in a closed position, preventing fluid in the fluid supply line 202 of the parking brakes 200 from causing the spring to release, thereby causing the parking brakes 200 to remain engaged, or in an applied position.

Responsive to a signal indicating that the lock 218 is in the locked condition, the controller 110 is operative to cause the brake line valve 114 to move to an open position, enabling fluid in the fluid supply line 202 of the parking brake 200 to cause release of the spring, and thereby causing the parking brakes to disengage, or to be in an unapplied position. In alternative exemplary arrangements, responsive to a signal indicating that the lock 218 is in the locked condition, the controller is operative to cause the brake line valve 114 to move an open position, thereby enabling the parking brake 200 to be moved to a disengaged position through manual manipulation of the manual parking brake valve 118.

In this way, the operator is prevented from pulling away from the trailer or towed object 113 until a proper connection between the fifth wheel 212 and the kingpin 216 is achieved by engagement of the parking brakes 200. Once a proper connection between the fifth wheel 212 and the kingpin 216 is achieved, the operator is enabled to pull forward towing the trailer or towed object 113 because the brakes 200 are no longer engaged. However, the present general inventive concept is not limited thereto.

In exemplary embodiments, the exemplary load bearing sensor 120 is in operative connection with the load bearing suspension 204. In certain exemplary embodiments, the exemplary load bearing sensor 120 is in operative connection with the airbags 206. The exemplary load bearing sensor 120 is operative to sense or determine a current pressure of air within the airbag 206. The exemplary controller 110 is operative to receive signals from the sensor 120 indicating the current pressure of the airbag 206.

The exemplary controller 110 may also include a display or gauge that is operative to output a visual representation of the current air pressure within the airbags 206. In this way, the operator of the towing vehicle or the controller 110 is enabled to determine whether the weight of the trailer or towed object 113 is currently supported by the rear axle of the tractor or towing vehicle 112 responsive to the output current air pressure of the airbags 206 on the display. The display may also include an output corresponding to a current height of the fifth wheel 212 for proper vertical alignment with the kingpin 216 of the trailer or towed object 113.

In some exemplary embodiments, the load bearing sensor 120 and the lock condition sensor 116 are configured to operate in tandem. For example, if the load bearing sensor 120 indicates that the load of the trailer or towed object 113 is supported by the tractor or towing vehicle 112, and the lock condition sensor 116 indicates that the lock 218 is not in a locked condition around the kingpin 216, the controller 110 is operative to cause the brake line valve 114 to remain in the closed position, thereby causing the parking brakes 200 to be in the engaged position and not allowing the tractor or towing vehicle 112 or towing vehicle to move relative to the trailer or towed object 113 or towed object.

In exemplary embodiments, the exemplary controller 110 includes in operative connection therewith a reverse indicator switch 126. The exemplary reverse indicator switch 126 is configured to be moved between an on position and an off position via manual manipulation by the operator. In the on position of the reverse indicator switch 126, the operations of the controller 110 with respect to the brake line valve 114, lock condition sensor 116, and the load bearing sensor 120 are disabled, or will be overridden, such that the parking brakes 200 are not inadvertently applied when the operator is purposefully backing up the trailer or towed object 113 to engage the kingpin 216 in the throat 214 of the fifth wheel 212. In the off position of the reverse indicator switch 126, the operations of the controller 110 with respect to the brake line valve 114, the lock condition sensor 116, and the load bearing sensor 120 are enabled and operate as discussed.

In alternative exemplary embodiments, certain functions of the load bearing sensor 120 may remain enabled when the reverse indicator switch 126 is in the on position. For example, in embodiments including optical sensors for vertically aligning the fifth wheel 212 and the kingpin 216, these systems may remain enabled when the reverse indicator switch 126 is in the on position, thereby enabling the fifth wheel 212 to be automatically vertically aligned with the kingpin 216 while the operator is backing up the tractor or towing vehicle 112 to connect the fifth wheel 212 and the kingpin 216. However, the present general inventive concept is not limited thereto.

The exemplary reverse indicator switch 126 may include in operative connection therewith an audio output device and a light indicator that are configured to make the operator aware that the reverse indicator switch 126 is in the on position. The audio output device and the light indicator may be alternatively referred to herein as an output device that is operative to output at least one of an audible or visual output. When the reverse indicator switch 126 is in the on position, the exemplary controller 110 is operative to cause the audio output device to output an audible noise, such as a beeping noise, and the light indicator to emit light. As such, the operator is notified that the reverse indicator switch 126 is in the on position, and the safety system 100 is disabled. In exemplary embodiments, the audible output, and the emission of light through the light indicator do not stop until the reverse indicator switch 126 is moved to the off position, and the safety system 100 is again enabled. However, the present general inventive concept is not limited thereto.

In exemplary embodiments, the exemplary controller 110 includes in operative connection therewith a pull away override switch 130. The exemplary pull away override switch 130 is configured to be moved between an on position and an off position via manual manipulation by the operator. In the on position of the override switch 130, the operations of the controller 110 with respect to the brake line valve 114, lock condition sensor 116, and the load bearing sensor 120 are disabled, or will be overridden, such that the parking brakes 200 are not inadvertently applied when the operator is purposefully pulling away from the trailer or towed object 113. In the off position of the override switch 130, the operations of the controller 110 with respect to the brake line valve 114, the lock condition sensor 116, and the load bearing sensor 120 are enabled, and operate as discussed.

In exemplary embodiments, the pull away override switch 130 includes an audio output device and a light indicator that operate in the same manner as the audio output device and light indicator in operative connection with the reverse indicator switch 126. The audio output device and the light indicator may be alternatively referred to herein as an output device that is operative to output at least one of an audible or visual output. In this way, the override switch 130 is operative to enable the operator to pull away from the trailer or towed object 113 when the operator needs to realign the tractor or towing vehicle 112 relative to the trailer or towed object 113 for proper connection of the kingpin 216 and fifth wheel 212. In addition, the override switch 130 is operative to enable the operator to drive the tractor or towing vehicle 112 away from the trailer or towed object 113 in times of operating the tractor or towing vehicle 112 without connection to a trailer or towed object 113 as well as in emergency or other situations. Similar to the reverse indicator switch 126, the audible output device and the light indicator in operative connection with the override switch 130 may remain on until the fifth wheel 212 and the kingpin 216 are properly connected, or for a set duration of time such that the audible output and the light emitted will eventually cease if the operator is operating the tractor or towing vehicle 112 in times of emergency or other non-towing situation. However, the present general inventive concept is not limited thereto.

Now referring to FIG. 5. There is shown therein an alternative exemplary embodiment providing a safety system 300 for towing a vehicle and a towed object. The exemplary embodiment shown in FIG. 5 is similar to the other embodiments discussed herein and is configured to include all of the features and relationships discussed therewith. Further, similarly termed features and relationships are configured to operate in an identical manner as previously discussed. The exemplary system 300 is designed to prevent a towing vehicle from moving until the towing vehicle is properly connected with a towed object, and to maintain a brake system of the towing vehicle in an engaged position until a proper connection between the towing vehicle and the towed object is established.

As shown in FIG. 5, the alternative exemplary embodiment comprises a fluid/air supply source or air compressor 301. The exemplary air supply source includes a valve 302 that is moveable between open and closed or on and off positions to control the flow of fluid or air to a parking brake or brake system 304. The alternative exemplary embodiment further includes a manual parking brake switch or valve 303. The manual parking brake switch or valve 303 is manually operated by an operator of the towing vehicle or semi-truck or tractor or towing vehicle.

The alternative exemplary embodiment further comprises a power source or battery supply 305. The exemplary power source 305 is configured to supply power to the system 300.

The alternative exemplary embodiment further comprises a reverse indicator switch 306, similar to reverse indicator 126. The exemplary reverse indicator switch 306 is configured to override the other functions of the system 300 when the towing vehicle is in reverse in an effort to engage the towing vehicle connection point or coupling and the towed vehicle connection point, for example a fifth wheel of a semi-truck or tractor or towing vehicle and the kingpin of a trailer or towed object.

The alternative exemplary embodiment further includes a pull away override switch 307, similar to the pull away override switch 130. The exemplary pull away override switch 307 is configured to override the other functions of the system 300 when the operator is intentionally disengaging the connection point of the towing vehicle and the connection point of the towed object.

The alternative exemplary embodiment further includes a fifth wheel lock sensor or indicator switch 308. The exemplary fifth wheel lock sensor or indicator switch 308 is similar to the 116.

The alternative exemplary embodiment further includes a load bearing sensor or indicator switch 309, similar to the load bearing sensor 120. The exemplary load bearing sensors are in operative connection with a load bearing suspension 310. The exemplary load bearing suspension 310 is similar to the load bearing suspension 204 and includes at least one airbag 314 in operative connection therewith. The airbag 314 may be in operative connection with the compressor 301 via an air supply line 315. The exemplary load bearing sensor 309 is configured to communicate or transmit signals at certain air pressures of the airbag 314 to communicate to the controller 313 and operator that the towing vehicle is supporting extra weight. The exemplary load bearing sensor 309 is also configured to communicate or transmit signals at certain pressures of the airbags 314 to the controller 313 and operator indicating that the airbags 314 have a low pressure to prevent air bag pressure that was released from dropping the suspension 310 to enable the towing vehicle to get under the towed object.

The alternative exemplary embodiment further includes a fluid or air line 311, also referred to herein as a brake line.

The exemplary fluid or air line 311 is in operative fluid connection with the compressor 301, the brake valves 302, and the brake system 304.

The alternative exemplary embodiment further includes at least one circuit 312. The exemplary circuit 312 is in operative connection with the brake valves 302, power source 305, reverse indicator switch 306, pull away override switch 307, fifth wheel lock sensor or switch 308, load bearing sensor or switch 309, and a controller 313. However, as can be appreciated, this alternative exemplary embodiment is merely exemplary, and in other embodiments, other embodiments may be used.

An exemplary embodiment provides a safety system for a towing vehicle and a towed object, comprising: a fifth wheel, wherein the fifth wheel is in operative connection with the towing vehicle; a kingpin, wherein the kingpin is in operative connection with the towed object, and wherein the kingpin is engageable with the fifth wheel; a fifth wheel lock, wherein the fifth wheel lock is movable between a locked position and an unlocked position, wherein in the locked position, the kingpin is held in engagement with the fifth wheel, and wherein in the unlocked position, the kingpin is enabled to be disengaged from the fifth wheel; a fifth wheel lock sensor, wherein the fifth wheel lock sensor is operative to sense whether the fifth wheel lock is in the locked position or in the unlocked position; a brake system, wherein the brake system is in operative connection with the wheels of the towing vehicle, wherein the brake system is moveable between a brake system engaged position and a brake system disengaged position, wherein in the brake system engaged position the wheels of the towing vehicle are prevented from moving in a forward direction, and wherein in the brake system disengaged position the wheels of the towing vehicle are enabled to move in the forward direction; a controller, wherein the controller is in operative connection with the fifth wheel lock sensor and the brake system, and wherein the controller is operative to receive signals from the fifth wheel lock sensor, wherein responsive to a signal from the fifth wheel lock sensor indicating the fifth wheel lock is in the locked position, the controller is operative to cause the brake system to be in the disengaged position, and wherein responsive to a signal from the fifth wheel lock sensor indicating the fifth wheel lock is in the unlocked position, the controller is operative to cause the brake system to be in the engaged position.

In an alternative exemplary embodiment, the brake system includes an air compressor, an air supply line, and brake line valve, wherein the compressor, air supply line, and the brake line valve are in fluid connection, and wherein the brake line valve is moveable between an open position and a closed position.

In an alternative exemplary embodiment, the controller is configured to selectively cause the air compressor to cause a flow of air in the air supply line, wherein the controller is in operative connection with the brake line valve, and wherein the controller is operative to cause the brake line valve to move between the open position and the closed position, wherein in the closed position of the brake line valve the parking brake system is in the engaged position, and wherein in the open position of the brake line valve the parking brake system is in the disengaged position.

In an alternative exemplary embodiment, the controller is operative to cause the brake line valve to be in the open position responsive to receipt of a signal from the fifth wheel lock sensor indicating that the fifth wheel lock is in the locked position.

In an alternative exemplary embodiment, the controller is operative to cause the brake line valve to be in the closed position responsive to receipt of a signal from the fifth wheel lock sensor indicating that the fifth wheel lock is in the unlocked position.

In alternative exemplary embodiment, the exemplary safety system further comprises: a load bearing suspension system, wherein the load bearing suspension system is in operative connection with a rear axle of the towing vehicle, and wherein the load bearing suspension system is configured to support the load of the towed object; and a load bearing suspension sensor, wherein the load bearing suspension sensor is in operative connection with the load bearing suspension system, and wherein the load bearing suspension sensor is operative to sense whether the towing vehicle is supporting the load of the towed object; wherein the controller is in operative connection with the load bearing suspension sensor and is operative to receive signals therefrom, wherein responsive to a signal from the load bearing suspension sensor indicating the towing vehicle is supporting the load of the towed object, the controller is operative to cause the brake system to be in the engaged position until the controller receives a signal indicating the lock is in the locked position.

In an alternative exemplary embodiment, the load bearing suspension system includes at least one airbag, wherein the at least one airbag is in operative connection with the rear axle of the towing vehicle, and wherein the at least one airbag is in operative fluid connection with the air compressor.

In an alternative exemplary embodiment, the load bearing sensor is in operative connection with the at least one airbag, and wherein the load bearing sensor is operative to determine the current air pressure within the airbag, wherein the controller is operative to receive a signal from the load bearing sensor indicating the current air pressure of the airbag, and wherein the controller is operative to determine whether the towing vehicle is supporting the load of the towed vehicle responsive to the signal indicating the current air pressure of the airbag.

In an alternative exemplary embodiments, the exemplary system further comprises a manually engageable reverse indicator switch, wherein the manually engageable reverse indicator switch is in operative connection with the controller, and wherein the manually engageable reverse indicator switch is moveable between a reverse indicator switch on position and a reverse indicator switch off position, wherein in the reverse indicator switch on position, the controller is prevented from causing the parking brake system to be in the engaged position. In alternative exemplary embodiments, the reverse indicator switch is configured to operate in response to gear switches by the operator of the towing vehicle.

In an alternative exemplary embodiment, the manually engageable reverse indicator switch includes at least one output device in operative connection therewith, wherein when the reverse indicator switch is in the on position, the output device is operative to output at least one of an audible or visual output.

In an alternative exemplary embodiment, the exemplary safety system further comprises a manually engageable pull away override switch, wherein the manually engageable pull away override switch is in operative connection with the controller, and wherein the manually engageable pull away override switch is moveable between a pull away override switch on position and pull away override switch off position, wherein in the pull away override switch on position, the controller is prevented from causing the parking brake system to be in the engaged position.

In an alternative exemplary embodiment, the manually engageable pull away override switch is in operative connection with the at least one output device, wherein when the pull away override switch is in the on position, the output device is operative to output at least one of an audible or visual output.

An alternative exemplary embodiment provides a safety system for a towing vehicle and a towed object which includes a fifth wheel, wherein the fifth wheel is in operative connection with the towing vehicle; a kingpin, wherein the kingpin is in operative connection with the towed object, and wherein the kingpin is engageable with the fifth wheel; a fifth wheel lock, wherein the fifth wheel lock is movable between a locked position and an unlocked position, wherein in the locked position, the kingpin is held in engagement with the fifth wheel, and wherein in the unlocked position, the kingpin is enabled to be disengaged from the fifth wheel; a fifth wheel lock sensor, wherein the fifth wheel lock sensor is operative to sense whether the fifth wheel lock is in the locked position or in the unlocked position; a brake system, wherein the brake system is moveable between a brake system engaged position and a brake system disengaged position, wherein in the brake system engaged position the towing vehicle is prevented from moving in a forward direction, and wherein in the brake system disengaged position the towing vehicle is enabled to move in the forward direction; a controller, wherein the controller is in operative connection with the fifth wheel lock sensor and the brake system, and wherein the controller is operative to receive signals from the fifth wheel lock sensor, wherein responsive to a signal from the fifth wheel lock sensor indicating the fifth wheel lock is in the locked position, the controller is operative to cause the brake system to be in the disengaged position, and wherein responsive to a signal from the fifth wheel lock sensor indicating the fifth wheel lock is in the unlocked position, the controller is operative to cause the brake system to be in the engaged position.

An alternative exemplary embodiment provides a safety system for a towing vehicle and a towed object which includes a towing vehicle coupling, a towed vehicle connection point, wherein the towed vehicle connection point is engageable with the towing vehicle coupling; a coupling lock, wherein the coupling lock is movable between a locked position and an unlocked position, wherein in the locked position, the towed vehicle connection point is held in engagement with the towing vehicle coupling, and wherein in the unlocked position, the towed vehicle connection point is enabled to be disengaged from the towing vehicle coupling; a lock sensor, wherein the lock sensor is operative to sense whether the coupling lock is in the locked position or in the unlocked position; a brake system, wherein the brake system is moveable between a brake system engaged position and a brake system disengaged position, wherein in the brake system engaged position the towing vehicle is prevented from moving in a forward direction, and wherein in the brake system disengaged position the towing vehicle is enabled to move in the forward direction; a controller, wherein the controller is in operative connection with the lock sensor and the brake system, and wherein the controller is operative to receive signals from the lock sensor, wherein responsive to a signal from the lock sensor indicating the coupling lock is in the locked position, the controller is operative to cause the brake system to be in the disengaged position, and wherein responsive to a signal from the lock sensor indicating the coupling lock is in the unlocked position, the controller is operative to cause the brake system to be in the engaged position.

Although a few exemplary embodiments have been illustrated and described, it will be appreciated by those skilled in the art that changes may be made in these exemplary embodiments, and other exemplary embodiments may be made including combinations of the various features and relationships described herein, without departing from the principles and spirit of the disclosure, the scope of which is defined in the appended claims and their equivalents.

What is claimed is:

1. A safety system for a towing vehicle and a towed object, comprising:
   a towing vehicle coupling;
   a towed object connection point, wherein the towed object connection point is engageable with the towing vehicle coupling;
   a coupling lock, wherein the coupling lock is movable between a locked position and an unlocked position,
   a lock sensor, wherein the lock sensor is operative to detect whether the coupling lock is in the locked position or in the unlocked position;
   a brake system, wherein the brake system is moveable between a brake system engaged position and a brake system disengaged position,
   a controller, wherein the controller is in operative connection with the lock sensor and the brake system, and wherein the controller is operative to receive signals from the lock sensor,
   a load bearing suspension system in operative connection with the towing vehicle and configured to support the load of the towed object, and a load bearing suspension sensor in operative connection with the load bearing suspension system and operative to sense whether the towing vehicle is supporting the load of the towed object,
   wherein in response to a signal from the lock sensor indicating the coupling lock is in the locked position, the controller is operative to enable the brake system to be in the disengaged position responsive to manual manipulation of a parking brake valve, and
   wherein responsive to a signal from the load bearing suspension sensor indicating the towing vehicle is supporting the load of the towed object, the controller is operative to cause the brake system to be in the engaged position until the controller receives a signal indicating the coupling lock is in the locked position.

2. The safety system of claim 1, wherein in response to a signal from the lock sensor indicating the coupling lock is in the unlocked position, the controller is operative to cause the brake system to be in the engaged position.

3. The safety system of claim 1, wherein the brake system includes an air compressor, an air supply line, and brake line valve, wherein the compressor, air supply line, and the brake line valve are in fluid connection, and wherein the brake line valve is moveable between an open position and a closed position.

4. The safety system of claim 3, wherein the controller is in operative connection with the brake line valve, and wherein the controller is operative to cause the brake line valve to move between the open position and the closed position, wherein in the closed position of the brake line valve the brake system is in the engaged position, and wherein in the open position of the brake line valve the brake system is enabled to be moved to the disengaged position through the manual parking brake valve.

5. The safety system of claim 4, wherein the load bearing suspension includes at least one airbag, wherein the at least one airbag is in operative connection with a rear axle of the towing vehicle, and wherein the at least one airbag is in operative fluid connection with the air compressor.

6. The safety system of claim 5, wherein the load bearing sensor is in operative connection with the at least one airbag and is operative to determine a current air pressure within the airbag, wherein the controller is operative to receive a signal from the load bearing sensor indicating the current air pressure of the airbag and responsive thereto, the controller is operative to determine whether the towing vehicle is supporting the load of the towed object.

7. The safety system of claim 1, further comprising: a manually engageable reverse indicator switch in operative connection with the controller, wherein the manually engageable reverse indicator switch is moveable between a reverse indicator switch on position and a reverse indicator switch off position, wherein in the reverse indicator switch on position, the controller is prevented from causing the brake system to be in the engaged position.

8. The safety system of claim 7, further comprising: at least one output device in operative connection with the reverse indicator switch, wherein when the reverse indicator switch is in the on position, the output device is operative to output at least one of an audible or visual output.

9. The safety system of claim 1, further comprising: a manually engageable pull away override switch in operative connection with the controller, wherein the manually engageable pull away override switch is moveable between a pull away override switch on position and pull away override switch off position, wherein in the pull away override switch on position, the controller is prevented from causing the brake system to be in the engaged position.

10. The safety system of claim 9, further comprising: at least one output device in operative connection with the pull away override switch, wherein when the pull away override switch is in the on position, the output device is operative to output at least one of an audible or visual output.

11. A computer implemented method of a safety system for a towing vehicle and a towed object, comprising:
determining with a lock sensor whether a towing vehicle coupling is locked in engagement with a towed vehicle connection point;
receiving with a controller a signal from the lock sensor indicating an unlocked position, wherein in the unlocked position the towed object connection point is not locked in engagement with the towing vehicle coupling;
responsive to the received signal indicating the unlocked position, causing with the controller a brake system to be in an engaged position,
responsive to a reverse indicator switch in a reverse indicator switch on position, causing with the controller the brake system to be in the disengaged position; and
responsive to a pull away override switch in a pull away override switch on position, causing with the controller the brake system to be in the disengaged position.

12. The computer implemented method of claim 11, further comprising:
receiving with a controller a signal from the lock sensor indicating a locked position,
wherein in the locked position the towed object connection point is locked in engagement with the towing vehicle coupling; and
responsive to the received signal indicating the locked position, enabling with the controller the brake system to be in a disengaged position through manipulation of a parking brake valve.

13. The computer implemented method of claim 12, further comprising:
responsive to a signal from a load bearing sensor indicating the towing vehicle is supporting a load of the towed object, causing with the controller the brake system to be in the engaged position.

14. The computer implemented method of claim 13, further comprising:
responsive to a signal from a load bearing sensor indicating the towing vehicle is supporting a load of the towed object, causing with the controller the brake system to be in the engaged position until the controller receives a signal from the lock sensor indicating the coupling lock is in the locked position.

15. The computer implemented method of claim 14, further comprising: responsive to at least one of the reverse indicator switch on position or the pull away override switch on position, causing with the controller an output device to output at least one of an audible output or a visual output.

* * * * *